United States Patent [19]

Hopkins et al.

[11] Patent Number: 5,274,246

[45] Date of Patent: Dec. 28, 1993

[54] OPTICAL MODULATION AND SWITCHING WITH ENHANCED THIRD ORDER NONLINEARITY MULTIPLE QUANTUM WELL EFFECTS

[75] Inventors: Frank K. Hopkins, Springboro; Joseph T. Boyd; Howard E. Jackson, both of Cincinnati, all of Ohio

[73] Assignee: The United States of America as represented by the Secretary of the Air Force, Wright-Patterson Air Force Base, Ohio

[21] Appl. No.: 878,272

[22] Filed: May 4, 1992

[51] Int. Cl.$^5$ ............................................. H01L 27/14
[52] U.S. Cl. ..................................... 257/17; 359/248; 385/14; 257/20; 257/21; 257/85; 257/98
[58] Field of Search ....................... 257/21, 17, 85, 98, 257/20; 359/248, 254, 246, 247, 252; 385/14

[56] References Cited

U.S. PATENT DOCUMENTS

| | | | |
|---|---|---|---|
| 4,796,068 | 1/1989 | Katayama et al. | 257/20 |
| 4,828,368 | 5/1989 | Efron et al. | 350/355 |
| 4,873,439 | 10/1989 | Hagelstein et al. | 250/327.2 |
| 4,880,297 | 11/1989 | Fejer et al. | 350/355 |
| 4,894,691 | 1/1990 | Matsui | 357/22 |
| 4,903,101 | 2/1990 | Maserjian | 357/30 |
| 4,905,056 | 2/1990 | Berndt et al. | 357/4 |
| 4,923,264 | 5/1990 | Langer et al. | 350/96.14 |
| 4,933,731 | 6/1990 | Kimura | 357/30 |
| 4,941,025 | 7/1990 | Tabatabaie | 357/16 |
| 4,957,337 | 9/1990 | Ogawa et al. | 350/96.13 |
| 5,053,843 | 10/1991 | Choudhury et al. | 257/20 X |
| 5,130,690 | 7/1992 | Ando et al. | 257/21 X |

OTHER PUBLICATIONS

Cibert et al., "Optically Detected Carrier Confinement to One and Zero Dimension in GaAs Quantum Well Wires and Boxes," Appl. Phys. Lett. 49(19), Nov. 10, 1986, pp. 1275-1277.

Y. Hirayama et al, "Fabrication of a GaAs Quantum-Well-Wire Structure by Ga Focused-Ion-Beam Implantation and its Optical Properties", Physical Review B, vol. 37, No. 5, Feb. 15, 1988, pp. 2774-2777.

K. Kash et al, "Strain-Induced Lateral Confinement of Excitons in Ga-As-AlGaAs Quantum Well Microstructures", Appl Phys Lett 53(9), Aug. 29, 1988, pp. 782-784.

J. Cibert et al, "Optically Detected Carrier Confinement to One and Zero Dimension in GaAs Quantum Well Wires and Boxes", Appl Phys Lett 49(19), Nov. 10, 1986, pp. 1275-1277.

R. Kubena et al, "Dot Lithography for Zero-Dimensional Quantum Wells using Focused Ion Beams", Appl Phys Lett 50(22), Jun. 1, 1987, pp. 1589-1591.

R. Kubena et al, "Current-Density Profiles for a GaAs+ Ion Microphobe and Their Lithographic Implications", Appl Phys Lett 51(23), Dec. 7, 1987, pp. 1960-1962.

Scott-Thomas et al, "Si Metal-Oxide Semiconductor Field Effect Transistor with 70-nm Slotted Gates for Study of Quasi-One-Dimensional Quantum Transport", J Vac Sci Technol B6(6), Nov./Dec. 1988, pp. 1841-1844.

(List continued on next page.)

*Primary Examiner*—William Mintel
*Attorney, Agent, or Firm*—Gerald B. Hollins; Thomas L. Kundert

[57] ABSTRACT

A multiple quantum well arrangement which achieves significantly improved third order optical nonlinearity in a semiconductor device by way of spatially periodic electrodes applied to the semiconductor device. The spatial period of the applied electrodes and the resulting exciton confinement dimension is improved over that of previous multiple quantum well structures and to the Bohr radius range of dimensions for the semicondcutor material by way of available improved electrode fabrication arrangements. Use of the achieved multiple quantum well superlattice device in nonlinear optical apparatus, especially of the switching and modulating type, is contemplated with application in the fields of telecommunications, computing, and military equipment being probable.

20 Claims, 2 Drawing Sheets

OTHER PUBLICATIONS

D. Miller, "Novel Optical Modulators and Bistable Devices Using the Self-Electro-Optic Effect in Semiconductor Quantum Wells", Surface Science 174(1986), pp. 221-232.

D. Chemla, "Quantum Wells for Photonics", Physics Today, May 1985, pp. 56-64.

S. Schmitt-Rink et al, "Linear and Nonlinear Optical Properties of Semi-conductor Quantum Wells", Advances in Physics, 1989, vol. 38, No. 2, pp. 89-188.

L. Esaki, "A Bird's Eye View on the Evolution of Semiconductor Super-lattices and Quantum Wells", IEEE Journal of Quantum Electronics, vol. QE-22, No. 9, Sep. 1986, pp. 1611-1624.

C. Wilkinson et al, "Fabrication of Very Small Devices for the Investigation of the One-Dimensional Transport", Superlattices and Microstructures, vol. 2, No. 6, 1986, pp. 587-591.

E. Corcoran, "Diminishing Dimensions", Scientific American, Nov. 1990, pp. 122-131.

T. Wood, "Multiple Quantum Well Devices for Optoelectronics", International Electron Devices Meeting Technical Digest, Dec. 1985, (New York:IEEE) pp. 458-461.

OPTICAL MODULATION AND SWITCHING WITH ENHANCED THIRD ORDER NONLINEARITY MULTIPLE QUANTUM WELL EFFECTS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of quantum well optical nonlinear techniques and to the use of spatially periodic electric field bias and exciton confinement to enhance third order nonlinear optical effects.

Nonlinear optical waveguides are an essential component in a number of proposed optical and electronic-optical systems which are of interest to the U. S. military. Presently available optical waveguide materials, materials such as lithium niobate, are inadequate for use in many of these systems as a result of several limiting factors. Such limitations include fabrication difficulties, slow response times, low power handling capability, and especially relatively small third-order nonlinear optical coefficients. Larger nonlinear optical coefficients along with fast sub-nanosecond response times are however, available in combined group III and group V periodic table semiconductor materials under appropriate operating conditions.

The nonlinearity coefficient available from such materials is particularly striking in that for example, third order nonlinear coefficients ($\chi^{(3)}$) in the range of $0.24 \times 10^{-9}$ esu are available for bulk gallium arsenide, however, coefficients as large as $10,000,000 \times 10^{-9}$ esu are available from gallium arsenide/aluminum gallium arsenide multiple quantum well structures. These larger nonlinear coefficients are achieved by band gap engineering in which the principal physical mechanism employed is the confinement of semiconductor electron-hole pairs, i.e., confinement of excitons in one dimension. Even these large nonlinear coefficients can be greatly enhanced by the additional confinement of excitons in two or even three dimensions. Such additional confinement arrangements have been achieved at least experimentally through etching of a confining structure as is disclosed in references 8 and 9 herein, by pattern ion implantation and annealing, as is disclosed in references 10 and 6 herein, and also by strain-induced lateral confinement, as is disclosed in reference 5 herein.

The concept of creating a periodic electric potential in the plane of a semiconductor multiple quantum well structure for the purpose of increasing electron mobility has been considered in reference 1 herein. The use of this multiple quantum well structure for enhancing electron mobility as described in this reference, however, is significantly different from the concept of the present invention and perhaps more importantly, the physical mechanism being utilized in reference 1 differs sharply from that of the present invention.

The issued patent art also discloses several examples of multiple quantum well structures applied to the achievement of nonlinear optical effects. Included in this patent art is the U.S. patent of M. M. Fejer et al., U.S. Pat. No. 4,880,297, which is concerned with a quantum well optical electric field biased nonlinear method and apparatus. The Fejer et al invention employs gallium arsenide and aluminum gallium arsenide optical structures disposed in optical waveguide elements and controlled by spatially periodic electrode members to introduce quadratic nonlinear susceptibility into the optical propagation characteristics of a quantum well layer structure.

It is notable however, that the Fejer et al quantum well structure is disclosed to produce quadratic nonlinear optical susceptibility, that is, an effective asymmetric $\chi^{(2)}$ effect as opposed to an enhancement of the $\chi^{(3)}$ effect as in the present invention. It is also notable that the Fejer et al disclosure is concerned with wavelength mixing utilization of the quantum well structure as opposed to uses in the optical switching and modulation art for the present invention. It is also notable that the Fejer et al apparatus employs a spatial period separation of the electrode elements and the achieved electric field—a spacing on the order of the coherence length of the desired three-wave interaction process (see column 4, lines 1-5). This spacing is opposed to a spacing period near the atomic Bohr radius in the present invention. The Bohr radius dimension is normally smaller by at least a few orders of magnitude than the coherence length disclosed in the Fejer et al apparatus.

The art of interest also includes the patents of U. Efron et al, and D. W. Langer et al., U.S. Pat. No 4,828,368 and U.S. Pat. No. 4,923,264 which are concerned with near bandgap radiation modulation spatial light modulators and a resonance coupled optical coupler with semiconductor waveguide layer comprising a multi-quantum-well structure, respectively. The Efron et al. and Langer et al. patents are each concerned with multiple quantum well arrangements wherein uniform electric fields are applied to the quantum well structure, as opposed to the spatially periodic fields of the present invention. In addition, the Efron et al device uses the electric field to shift the spectral location of an absorption phenomenon according to the Franz-Keldysh effect. The Langer et al patent relies on a resonant coupling mechanism between two waveguide layers with the coupling being dependent upon equal indices of refraction in the two layers and with the index of one layer being determined by quantum well effects and being responsive to an applied electric field.

Additional information which may be of background interest with respect to the present invention is included in the list of references appended to the specification and in the citation of prior art included in a disclosure statement which accompanies the patent application. The concepts disclosed in these appendix and disclosure statement listed publications are believed to be principally of background and less relevant interest in comparison with the three patent references listed above.

SUMMARY OF THE INVENTION

The present invention employs the nonlinear optical properties of semiconductor superlattices and multiple quantum wells to achieve improved photonic elements such as optical switches and optical modulators within an optical waveguide structure. One dimensional or multiple dimension exciton confinement is the principal mechanism for this nonlinear effect with the confinement dimension being on the order of the Bohr radius of the weakly bound electron-hole pair comprising the exciton in a semiconductor sample. Exciton confinement is achieved according to the invention through the use of a spatially periodic electric field effect—an effect achieved with an array of electrodes disposed across the surface of a semiconductor sample. The exciton confinement achieved nonlinear optical effect may be applied to photonic devices such as optical modulators and optical switches.

It is an object of the present invention, therefore, to enhance the third order or $\chi^{(3)}$ nonlinear optical effects which may be inherently present or otherwise induced in a semiconductor material sample.

It is another object of the invention to enhance these third order or $\chi^{(3)}$ optical nonlinearity effects through the use of electric field induced exciton confinement.

It is another object of the invention to achieve this optical nonlinearity through the use of exciton confinement in one or a plurality of differing dimensions in the semiconductor sample.

It is another object of the invention to achieve exciton confinement by way of electric fields having spatially periodic dimensions which are of the same order as Bohr radius of the exciton.

It is another object of the invention to utilize newly announced electrode fabrication arrangements for achieving Bohr radius dimensioned electrode spatial disposition.

It is another object of the invention to achieve optical effects of high nonlinear coefficient value through exciton confinement in one or more dimensions within a semiconductor sample.

It is another object of the invention to provide exciton confinement in which the conduction band or uppermost band electrons are confined to induced valley regions of the conduction band and holes are confined to induced hill regions of the lower or valence band.

It is another object of the invention to provide the valley and hill conduction band and valence band configurations by way of spatially periodic electrodes placed adjacent to a surface of the semiconductor material.

It is another object of the invention to provide an electrode controlled multiple quantum well exciton confinement which may be combined with other confinement arrangements such as etching, ion implantation/annealing, strain-induced confinement, and quantum wire confinement plus quantum dot structure confinement arrangements.

It is another object of the invention to provide periodic electric potential confinement of multiple quantum well superlattice excitons with a variety of differing Bohr radius spaced electrode fabrication arrangements.

Additional objects and features of the invention will be understood from the following description and claims and the accompanying drawings.

These and other objects of the invention may be achieved by the method for generating confined exciton third order nonlinear optical effects in a semiconductor sample by an incident optical beam comprising the steps of: (1) communicating the optical beam as input signal to a selected one of a transmission mode and a reflection mode beam altering relationship with an optical waveguide received sample of multiple quantum well semiconductor material, (2) generating within the body of a semiconductor material sample an exciton confinement energy band relationship wherein exciton electrons are concentrated in valley regions of an uppermost conduction band and exciton holes are concentrated in hill regions of a lowermost valence band, the generating step including disposing the conduction band valley and valence band hill regions within the semiconductor material by applying a spatially periodic electric field generating pattern of voltages across a surface region of the semiconductor material, the spatially periodic electric field having a period length equal to the atomic Bohr radius of the semiconductor material, and (3) collecting from the selected of semiconductor material transmission mode and reflection mode beam altering a pattern of voltages controlled third order optical nonlinearity effect altered beam output optical signal.

DETAILED DESCRIPTION

Figure 1A:
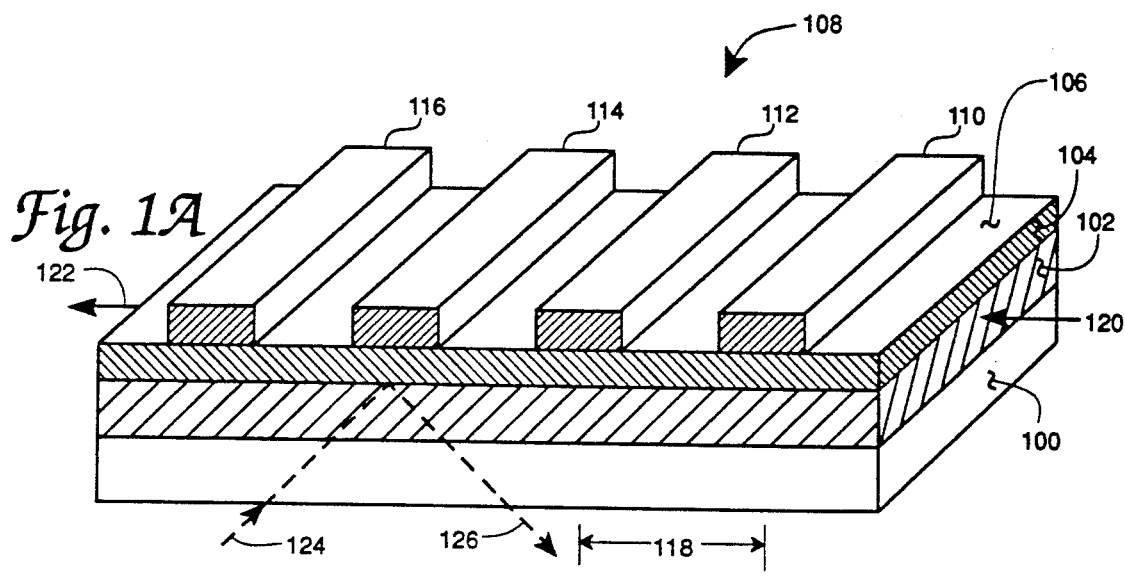
FIG. 1A shows a spatially periodic electrode array in combination with a multiple quantum well semiconductor device.
Figure 1B:
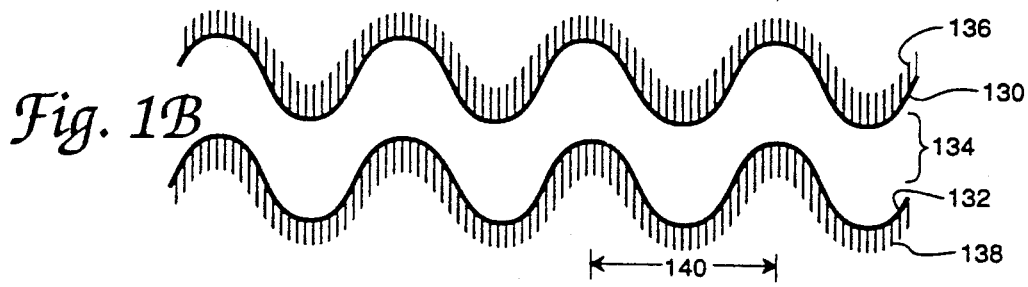
FIG. 1B shows an energy band structure relating to the FIG. 1A apparatus.

FIG. 1 in the drawings which includes the portions FIG. 1A and FIG. 1B, shows a spatially periodic electrode multiple quantum well nonlinear optical structure according to the invention. In the semiconductor assembly of the FIG. 1A drawing the number 100 indicates a substrate member which may be fabricated of some periodic table group III-V material such as gallium arsenide. As indicated by the number 102, there is disposed on a top surface portion of the substrate 100 a layer of multiple quantum well superlattice semiconductor material which may also be of the gallium arsenide variety. Typically, the layer 102 in FIG. 1A may be of thickness between 100nm and 1.5um. Both the thickness and the doping concentration used are, however, dependent upon the specific application of the FIG. 1A device.

The multiple quantum well material layer 102 in FIG. 1A may be composed of a number of sublayers or wells which collectively comprise the layer 102. In the FIG. 1A embodiment of the invention the layer 102 may be comprised of 10 to 200 periods each including alternating films of barrier and quantum well material, with each barrier layer being of 10 to 100nm thickness and each quantum well film being of 2 to 70nm thickness. Multiple quantum well material of the type desired at 102 in the FIG. 1 structure is more fully discussed in the publication of reference 3 which is hereby incorporated by reference herein.

Disposed over the multiple quantum well superlattice material layer 102 in FIG. 1A is an insulating layer 104 which may be composed of silicon dioxide or silicon nitride, and which may have a thickness in the range of 20nm. The insulating layer's thickness is less than the electrode spacing employed in the FIG. 1A device but is sufficiently thick to provide electrical insulation. The average index of refraction of the selected insulator is less than that of the layer 102. The layer 104 therefore is desirably a good insulation and serves to electrically isolate the multiple quantum well superlattice material of the layer 102. The insulating layer 104 also serves as a mounting or supporting element at its surface 106 for an array 108 of electrode elements. Although only four individual electrodes 110, 112, 114 and 116 of electrode array 108, are shown in FIG. 1A, the number of electrodes in the array received on the surface 106 of the insulating layer 104 could, in fact be large.

The electrodes of the array 108 are preferably arranged to be metallic in nature and may be comprised of aluminum metal which is disposed on the surface 106 by such arrangement as electron beam lithography, as has been described in the technical literature. Preferably, the electrode spacing for the array 108 is equal to or less than the exciton Bohr radius of the e.g. gallium arsenide used in the layers 100 and 102, or in other words, is in the range of 28nm or less for gallium arsenide material. Metallic structures of this dimension and in fact, structures with line widths as small as 20nm have been described in the literature, and line widths as small as 10nm have been discussed in the technical community.

The hill and valley configured energy band structure for the multiple quantum well material layer 102 is represented in FIG. 1B of the drawings and is a significant aspect of the present invention, as is described more fully below. The spatial period of this electrode induced hill and valley shaped energy band structure is indicated at 118.

The arrows 120 and 122 in FIG. 1A represent one possible optical path by which the FIG. 1A multiple quantum well wave guide structure can be utilized. According to this arrangement, light incident on the FIG. 1A structure arrives along the arrow 120 and is transmitted through the multiple quantum well material layer 102 and emerges along the arrow 122 in nonlinear optical processed form. Alternately, the input optical energy may arrive along the arrow 124 and, upon reflection from the multiple quantum well material layer 102, emerge from the FIG. 1A structure along the arrow 126.

During operation of the FIG. 1A multiple quantum well structure a spatially periodic electric field established within the material layer 102 by the electrode array 108 acts to confine excitons within the multiple quantum well sublayers of the material layer 102. The term "exciton" as indicated above describes the combination of an electrostatically bound electron and hole in a semiconductor material crystal.

FIG. 1B shows the nature of the band structure, that is, the conduction band 130 and the valence band 132 which results from application of suitable electrical potential or potentials to the electrode array 108 to establish the exciton confinement environment. In the case of a gallium arsenide embodiment of the FIG. 1A structure as described above, the electrode array 108 may be operated at a voltage potential in the range of zero to a breakdown limited voltage with the array elements 110, 112, 114 and 116 being of uniform potential, for example with respect to the substrate 100. The spatial period 118 of the electrodes 110 and 112 is the same as the spatial period of the hill and valley deformations 140 of the conduction band and valence band established within the material layer 102.

The nature of the normal energy band structure in a semiconductor material as shown in FIG. 1B is believed to be well understood in the solid state electronics art.

According to this understanding, the space 134 between the conduction band and valence band 130 and 132 represents the energy gap of the semiconductor material. In this relationship moreover, the conduction band 130 and valence band 132 each have a normally flat spatial variation. Application of the above-described potential to the electrode array 108, however, produces the hill and valley distortion or the modifications of the conduction band and valence band which are shown in FIG. 1B. In the present invention, electrons are essentially confined to the valleys of the modified upper or conduction band 130, such electron confinement being indicated at 136 in FIG. 1B. In a similar manner, the hill regions of hole confinement in the FIG. 1A structure are represented at 138 in the FIG. 1B drawing.

According to a significant aspect of the present invention, the emerging availability of electrode line widths in the range of 10nm to 20nm in the electronic art enables accomplishment of spatial periods 118 and 140 which are in the same dimensional range as the Bohr radius of gallium arsenide. The excitonic Bohr radius of bulk gallium arsenide is, for example, in the range of 28nm. The small dimensions in the present invention, which enable the confinement of excitons to the order of this excitonic Bohr radius or a smaller size, therefore enable achievement of the significantly larger nonlinear optical effects described herein. Dimensions of this size are as indicated above disclosed by D. S. Chemla in reference 3 herein.

The exciton confinement provided by the electric field of electrode array structure 108 accomplishes high coefficient optical nonlinearities by way of extending basic concepts described in the published article by S. Schmitt-Rink et al, "Linear and Nonlinear Optical Properties of Semiconductor Quantum Walls," *Advances in Physics* (volume 38), pp 89–188. The Schmitt-Rink et al article also is hereby incorporated by reference herein. In contrast with the fundamental concepts of Nonlinear Optical Properties disclosed in the Schmitt-Rink et al article, the present invention achievement of this confinement is controllable by a voltage potential applied to the electrode array 108. The presently achieved optical linearity may be described as an enhancement of the third order or $\chi^{(3)}$ nonlinearity where the $\chi^{(3)}$ expression appears in the equation:

$$P = \chi^{(1)}E + \chi^{(2)}E^2 + \chi^{(3)}E^3 \tag{1}$$

$$\chi^{(3)} = \chi^{(3)}(V) \tag{2}$$

where
P represents electric polarization,
E represents electric field strength, and
$\chi$ represents optical polarizability coefficients.

Equation (1) is described in the text by Y. R. Shen, The Principles of Nonlinear Optics, John Wiley & Sons, 1984, with the exception that $\chi^{(3)}$ is in fact dependent upon voltage. The $\chi^{(3)}$ nonlinearity achieved with the present spatial period electrodes and applied electrode potentials is of course readily distinguished from the $\chi^{(2)}$ nonlinearity effects—effects which are discussed in the above referred-to prior patents, and especially in the patent of M. M. Fejer et al.

The $\chi^{(3)}$ nonlinearity achieved in the FIG. 1 apparatus is in fact supplemental to a degree of such nonlinearity inherently present in a semiconductor material of the periodic table group III-V type and may also be employed as a supplement to a smaller degree of such linearity achieved by other confinement arrangements. Such other confinements may result from the etching of confining structures as described in references 8 and 9 herein, by patterned ion implantation plus annealing as described in references 10 and 6 herein, and also as achieved by strain induced lateral confinement, as is described in reference 5 herein.

Each of the references 1-10 described herein is hereby incorporated by reference into the present document. Copies of these references are provided in the file history of the present document and are also available in most technical libraries.

The FIG. 1A apparatus achieves single dimension confinement of excitons in the multiple quantum well material layer 102. This confinement occurs along the left to right axis in the FIG. 1A structure as a result of the electric field generated by the electrode array 108. It is within the spirit of the invention, however, to achieve exciton confinements along additional directions of the FIG. 1A drawing. Such additional direction confinements of course require additional arrays of electrodes which may be disposed in the manner of the FIG. 1A electrodes or which may be disposed according to one of the alternate electrode arrangements disclosed in FIGS. 2-4 herein, with such disposals being in directions that are orthogonal to the array 108. Such multiple dimensional confinement of excitons is capable of producing significantly higher values of nonlinear optical coefficient than is achievable with single dimensional confinement.

As a comparison, for example, the inherent $\chi^{(3)}$ values in gallium arsenide can provide nonlinearity coefficients on the order of $0.24 \times 10^{-9}$ esu; the above identified previous confinement arrangements can achieve values of $10^{-2}$ esu; the herein described two dimension confinement values of greater than $10^{-2}$ esu and three-dimensional confinement can achieve values of 2 esu.

Figure 2A:
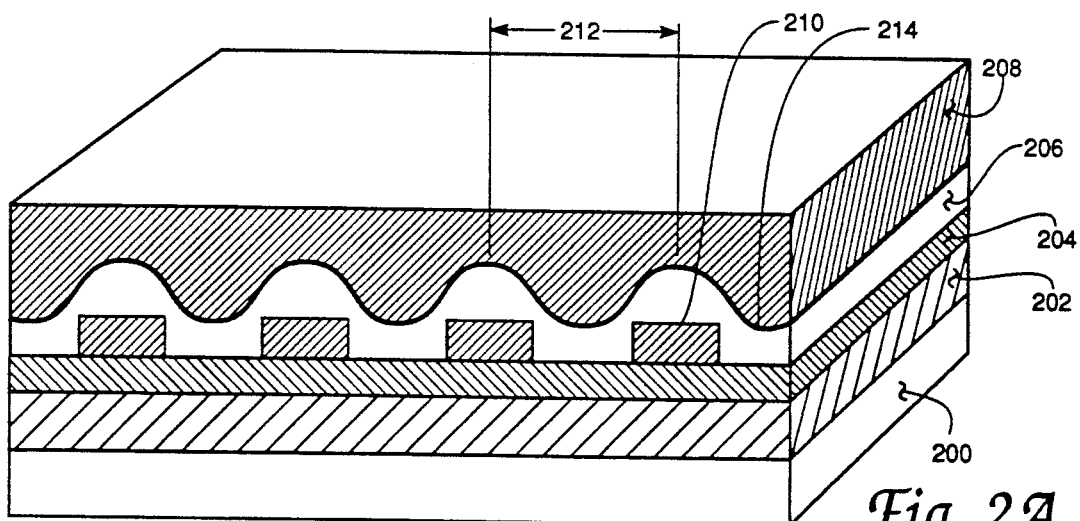
FIG. 2A shows an alternate arrangement of a multiple quantum well apparatus according to the invention.

FIG. 2 in the drawings shows an alternate arrangement of the invention, an arrangement which is, in fact, somewhat similar to that shown in FIG. 1A. In the FIG. 2A structure, the substrate is indicated at 200, the multiple quantum well superlattice layer at 202, and the insulating layer at 204, these numbers having tens and units digits similar to the numbers used in the described structure of the FIG. 1A drawing. Added to the FIG. 2A arrangement of the invention, however, is a second insulating layer 206 and an overlaying conductive coating of material such as metal, indicated at 208.

Figure 2B:
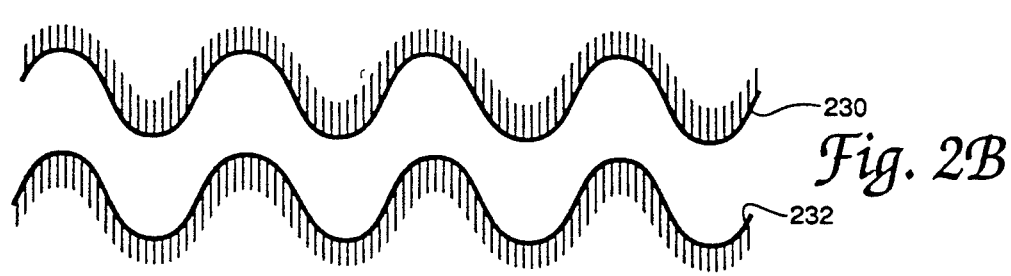
FIG. 2B shows an energy band arrangement relevant to the FIG. 2A structure.

The conduction band and valence band configurations for the multiple quantum well material 202 is indicated at 230 and 232 in FIG. 2B and the spatial period for both the electrodes and the electrode modified conduction and valence bands is indicated at 212 in FIG. 2A. During use of the FIG. 2 embodiment of the invention, the conductive layer 208 is preferably connected to a voltage source having a voltage potential between zero and ± the insulation breakdown voltage with respect to the substrate 200.

Several aspects of the FIG. 2A embodiment of the invention are notable. These include a need for an endwise-accomplished or within the insulating layer 206-accomplished connection of the individual electrodes 210; a replication of the hill and valley band configuration at 230 and 232 in the bottom-most or interface layer of the metal conductor 208, as is indicated at 214; and of course, need for the additional insulating layer 206. In the FIG. 2A embodiment of the invention, the metal layer 208 is a desirable addition to the nonlinear optical structure because it enables increased potential between the hills and valleys of the FIG. 2B band structure.

Figure 3A:
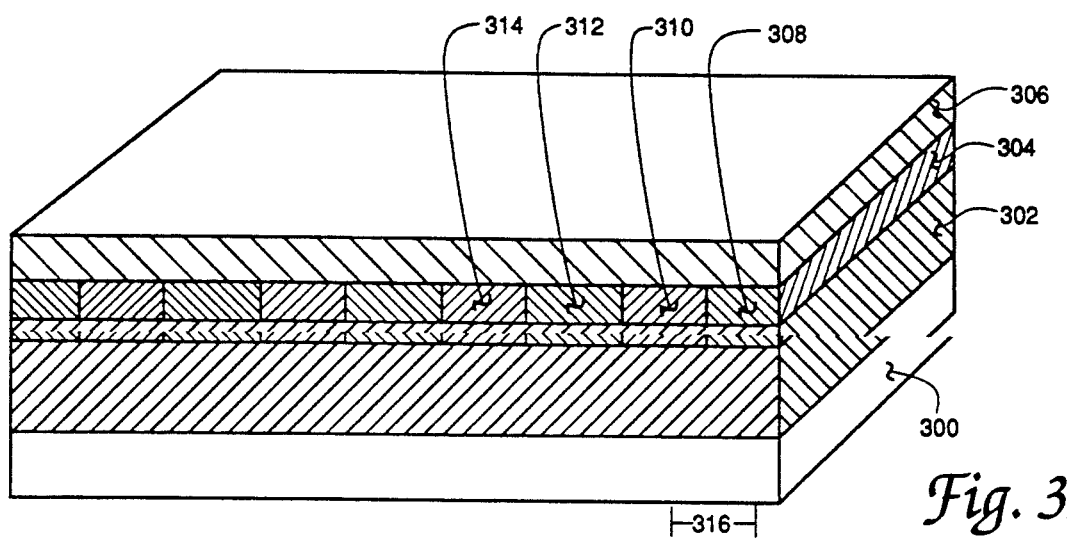
FIG. 3A shows another alternate arrangement of a multiple quantum well apparatus according to the invention.
Figure 3B:
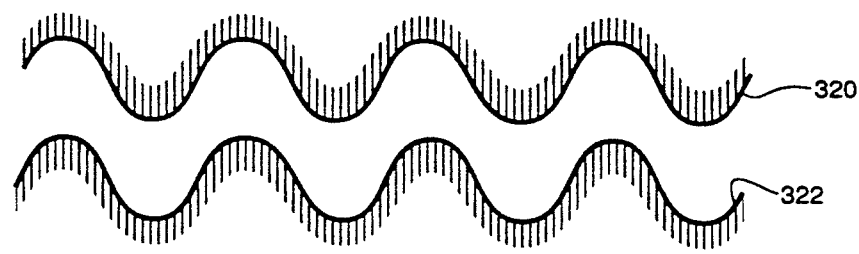
FIG. 3B shows an energy band arrangement relevant to the FIG. 3A structure.

FIG. 3 in the drawings shows an additional extension of the FIG. 2 concepts to a third embodiment of the invention. In the FIG. 3A multiple quantum well structure, the number 300 indicates the substrate member, the number 302 the multiple quantum well superlattice layer, and the number 304 a layer of dielectric strips which are indicated typically and individually at 308, 310, 312 and 314. The half period of this dielectric layer structure is indicated at 316, while the to-be-desired effect of the dielectric strip "electrodes" on the band structure in the layer 302 is indicated at 320 and 322 in FIG. 3B. The FIG. 3A embodiment of the invention also includes a conductive overlayer member 306 which may be fabricated of metal or other conductive material. The dielectric strips 308, 310, 312 and 314 are in the FIG. 3 arrangement of the invention, comprised of alternating strips of insulating material having different dielectric constants. A uniform potential applied to the conductive layer 306 achieves the results shown in FIG. 3B on the conduction band and valence band by way of the differing dielectric effects of the alternating insulating strips in the layer 304. With gallium arsenide semiconductor material used for the FIG. 3A embodiment of the invention, the adjacent insulating strips 308 and 310 for example, may be composed of silicon dioxide and benzocyclobutene (BCB)—materials which have dielectric constants of 3.82 and 2.7. As a result of these differing dielectric constants, a uniform potential applied to the conductive layer 306 produces an effect within the multiple quantum well layer 302 that is similar to that shown in the FIG. 1 embodiment of the invention. The FIG. 3 embodiment of the invention has the advantages of a thicker insulating layer 304 which reduces optical coupling into the conductive material.

Figure 4A:
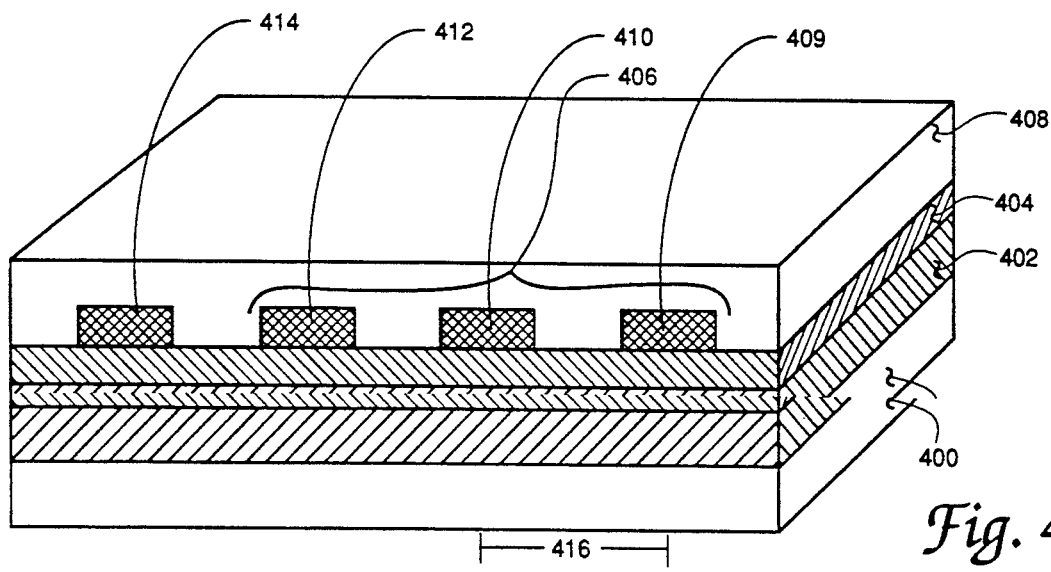
FIG. 4A shows another alternate arrangement of a multiple quantum well apparatus according to the invention.
Figure 4B:
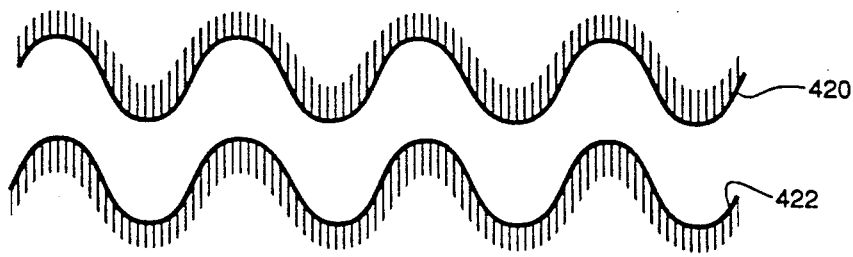
FIG. 4B shows an energy band arrangement relevant to the FIG. 4A structure.

FIG. 4 in the drawings shows yet another extension of the FIG. 2 and 3 concepts to a fourth embodiment of the invention. In the FIG. 4 drawing the gallium arsenide, for example, substrate is shown at 400, the multiple quantum well superlattice layer at 402, the insulating layer at 404, and an overlaying conductive layer at 408; these parts being related to the similar structure in FIGS. 1-3 of the drawings. In the FIG. 4 embodiment of the invention, the previously used electrodes are, however, replaced by an array of dielectric strips which is indicated at 406 and which includes the individual pseudo electrodes 409, 410, 412 and 414. The spatial period of these electrodes is indicated at 416 with the undulations produced by these pseudo electrodes in the conduction band 420 and the valence band 422 being of the same period length.

According to the underlying concept of the FIG. 4 embodiment, the dielectric constant of the insulating material used in the individual pseudo electrodes 409, 410, 412 and 414, together with the difference these pseudo electrodes make in the capacitive coupling between the conductive layer 408 and the multiple quantum well layer 402 serves to modulate the effect of potential applied to the conductive layer 404 with respect to the multiple quantum well layer 402. This modulation achieves a result not unlike that achieved in the FIG. 1-3 embodiments of the invention. For the gallium arsenide example materials, the dielectric strips 409, 410, 412 and 414 may be fabricated of silicon dioxide material having a dielectric constant of 3.82, for example. The dielectric strips could also be of the same materials as the layer 404-suitable materials being known in the semiconductor fabrication art.

It is interesting to note that the enhanced magnitude and electrically controllable optical nonlinearity characteristics of the invention may be used in a number of optical signal processing devices. Nonlinear optical characteristics are, for example, especially desirable in an optical signal modulator where the semiconductor nonlinear optical element is coupled to a laser light source of optical energy and to a voltage source of electrical signals which can cause the output optical signal to differ in intensity with respect to the optical input signal. The present invention's nonlinear optic characteristics are also useful in optical switching elements.

Variations of the disclosed apparatus within the scope of this invention are, of course, possible. According to one such variation, the metal composition of the electrically conductive electrodes 110, 112, 114, and 116 in FIG. 1 may be replaced with polycrystalline silicon conductor material that is fabricated using known semiconductor deposition, photographic masking, and etching techniques.

The present invention therefore offers significantly enhanced optical nonlinearity—nonlinearity such as is enabling of new photonic devices with significant size, weight and other improvement over existing apparatus. The ability to electrically turn on and turn off the optical nonlinearity achieved with the present invention is an especially useful capability and offers clear application where, for example, the modulation of an optical signal by way of an electrical signal is needed. The Previously competing quantum wire and quantum dot structures as are described in reference 4 herein are notably incapable of this turn on and turn off capability.

Exciton confinement by way of the small dimensioned electric field concepts described herein is also desirable in that the achieved confining structure is free of damaged surface effects which attend the etching of known confining structures. Etched surfaces are known in the electronic art to be severely degraded in electronic capability as compared to internal portions of the same semiconductor material.

Telecommunication and computing systems which are unresponsive to electromagnetic interference including electromagnetic nuclear weapon pulse effects and radio frequency interference may be achieved with circuit elements employing the present invention. Such elements have high information handling capability, are of potentially small physical size, and are of significantly improved reliability with respect to present-day devices, particularly electrical current carrying devices. The operating power level of such elements is also attractive, especially in outer space and other low-energy apparatus.

While the apparatus and method herein described constitute a preferred embodiment of the invention, it is to be understood that the invention is not limited to this precise form of apparatus or method and that changes may be made therein without departing from the scope of the invention which is defined in the appended claims.

APPENDIX—REFERENCE LIST

1. D. A. B. Miller, "Novel Optical Modulators and Bistable Devices Using the Self-Electro-Optic Effect in Semiconductor Quantum Wells", *Surface Science* 174 (1986), p. 221.
2. T. H. Wood, "Multiple Quantum Well Devices for Optoelectronics", *International Electron Devices Meeting Technical Digest*, Washington DC 1-4 Dec 85 (New York: IEEE).
3. D. S. Chemla, "Quantum Wells for Photonics", *Physics Today*, 38 (May 85), p. 56.
4. R. L. Kubena, R. J. Joyce, J. W. Ward, H. L. Garvin, F. P. Stratton, and R. G. Brault, "Dot Lithography for Zero-Dimensional Quantum Wells Using Focused Ion Beams", *Appl. Phys. Lett* 49, (1986), p. 1275.
5. R. L. Kubena and J. W. Ward, "Current-Density Profiles for a Ga+ Ion Microprobe and Their Lithographic Implications", *Appl. Phys. Lett.* 51 (7 Dec 87), p. 1960.
6. J. Cibert, P. M. Petroff, G. J. Dolan, S. J. Pearton, A. C. Gossard, and J. H. English, *Appl. Phys. Lett.* 49, (1986), p. 1275.
7. Y. Hirayama, Y. Suzu,i, S. Tarucha, and H. Okamoto, *Jpn. J. Appl. Phys.* 24, (1986), 53.
8. K. Kash, J. M. Worlock, M. D. Sturge, P. Grabbe, J. P. Harbison, A. Scherer, and P. S. D. Lin, "Strain-Induced Lateral Confinement of Excitons in GaAs-AlGaAs Quantum Well Microstructures", *Appl. Phys. Lett.* 53, (29 Aug 88), p. 782.
9. C. D. W. Wilkinson and S. P. Beamont, "Fabrication of Very Small Devices for the investigation of the One-Dimensional Transport", *Superlattices and Microstructures* 2, (1986), p. 587.
10. J. H. F. Scott-Thomas, M. A. Kastner, D. A. Antoniadis, H. I. Smith and S. Field, "Si Metal-Oxide Semiconductor Field Effect Transistor with 70-nm Slotted Gates for Study of Quasi-One-Dimensional Quantum Transport", *J. Vac. Sci. Technol.* B 6 (1988), p. 1841.

What is claimed is:

1. A multiple quantum well exciton confinement photonic apparatus of voltage determined large third order optical nonlinearity capability comprising the combination of:

a substrate member of selected semiconductor material composition;

a multiple quantum well modified layer of said semiconductor material formed over a portion of said substrate member;

a first layer of electrically insulating dielectric material formed over a portion of said multiple quantum well semiconductor material;

electrode array means including a plurality of electrode members disposed in spatial periodicity on said dielectric material adjacent said multiple quantum well semiconductor material layer and held at predetermined polarities and voltage amplitudes with respect to said substrate member for generating exciton confinement periodic regions and enhanced optical nonlinearity effects in said multiple quantum well semiconductor material;

said spatial periodicity being of a period substantially equal to a Bohr radius of said semiconductor material; and means including optical input and output port members for communicating light signals to and from said multiple quantum well semiconductor layer.

2. The apparatus of claim 1 wherein said semiconductor material comprises layers of compound semiconductor alloys incorporating periodic table group III and IV elements.

3. The apparatus of claim 2 wherein said electrode members comprise regions of increased electrical conductivity with respect to said dielectric material and with respect to material disposed between said electrode members.

4. The apparatus of claim 3 wherein said electrode members comprise electrical potential controlling individual strip element means disposed across and electrically insulating dielectric material at uniform spatial periods up to an excitonic Bohr radius of said semiconductor material for distorting a conduction band and a valence band in said layer of multiple quantum well semiconductor material into complementary undulating hill and valley patterns having substantially said excitonic Bohr radius spatial period.

5. The apparatus of claim 4 wherein said electrode members are comprised of metal.

6. The apparatus of claim 4 wherein said electrode members are comprised of polycrystalline semiconductor material.

7. The apparatus of claim 1 wherein said electrode members are spaced at intervals of less than thirty microns.

8. The apparatus of claim 1 wherein said semiconductor material is gallium arsenide.

9. The apparatus of claim 1 wherein said electrode members are comprised of metal and further including a second layer of electrical insulating material disposed over said metallic electrode members and a layer of metal material disposed over an exposed surface portion of said second layer of electrical insulating material.

10. The apparatus of claim 9 wherein said second layer of electrical insulating material and said layer of metal material include undulating complementary surface topographies.

11. The apparatus of claim 1 wherein said electrode members comprise electrically insulating material of differing dielectric constants, and further including a layer of metal disposed over an exposed surface portion of said electrically insulating material of differing dielectric constant.

12. The apparatus of claim 1 wherein said electrode members comprise physically separated electrical insulating pseudo electrode members having differing dielectric constant from said first electrically insulating dielectric material and further including a layer of metal overlaying said pseudo electrode members and spaces intermediate said pseudo electrode members.

13. A method for providing confined exciton third order nonlinear optical effects in a semiconductor sample incident optical beam comprising the steps of:

communicating said optical beam as input signal to a selected one of a transmission mode and a reflection mode beam altering relationship with an optical waveguide received sample of multiple quantum well said semiconductor material;

generating within said semiconductor material sample an exciton confinement energy band relationship wherein exciton electrons are concentrated in valley reigons of an uppermost conduction band and exciton holes are concentrated in hill regions of a lowermost valence band;

said generating step including disposing said conduction band valley and valence band hill regions within said semiconductor material by applying a spatially periodic electric field generating voltage pattern across a surface region of said semiconductor material;

said spatially periodic electric field having a period length up to an excitonic Bohr radius of said semiconductor material; and collecting from said semiconductor material a voltage controlled third order optical nonlinearity effect-altered beam output optical signal.

14. The method of claim 13 wherein said communicating, generating, and collecting steps comprise one-dimensional exciton confinement in said semiconductor sample and further including first additional steps comprising exciton confinement in a second physical dimension.

15. The method of claim 14 further including second additional steps comprising exciton confinement in a third physical dimension.

16. The method of claim 13 wherein said steps comprise beam amplitude modulation.

17. The method of claim 13 wherein said beam altering comprises beam on-and-off switching.

18. The method of claim 13 wherein said generating step includes energizing an array of semiconductor material surface-proximate electrode members with a predetermined pattern of electrode voltages.

19. The method of claim 18 wherein said generating step also includes disposing said electrodes at intervals equal to, or less than, said excitonic Bohr radius.

20. The method of claim 13 wherein said semiconductor sample includes one of an otherwise induced and an inherent therein third order nonlinear optical characteristic and wherein said communicating, generating, and collecting steps providing nonlinearity are supplementary to said otherwise induced and inherent third order nonlinearity.

* * * * *